Feb. 5, 1935.   R. BERNHARD ET AL   1,989,662
BOWL COOLER
Filed Jan. 10, 1933   3 Sheets-Sheet 1

Inventors
Richard Bernhard,
Richard D. Cheesman
By Eugene H. Purdy
their Attorney

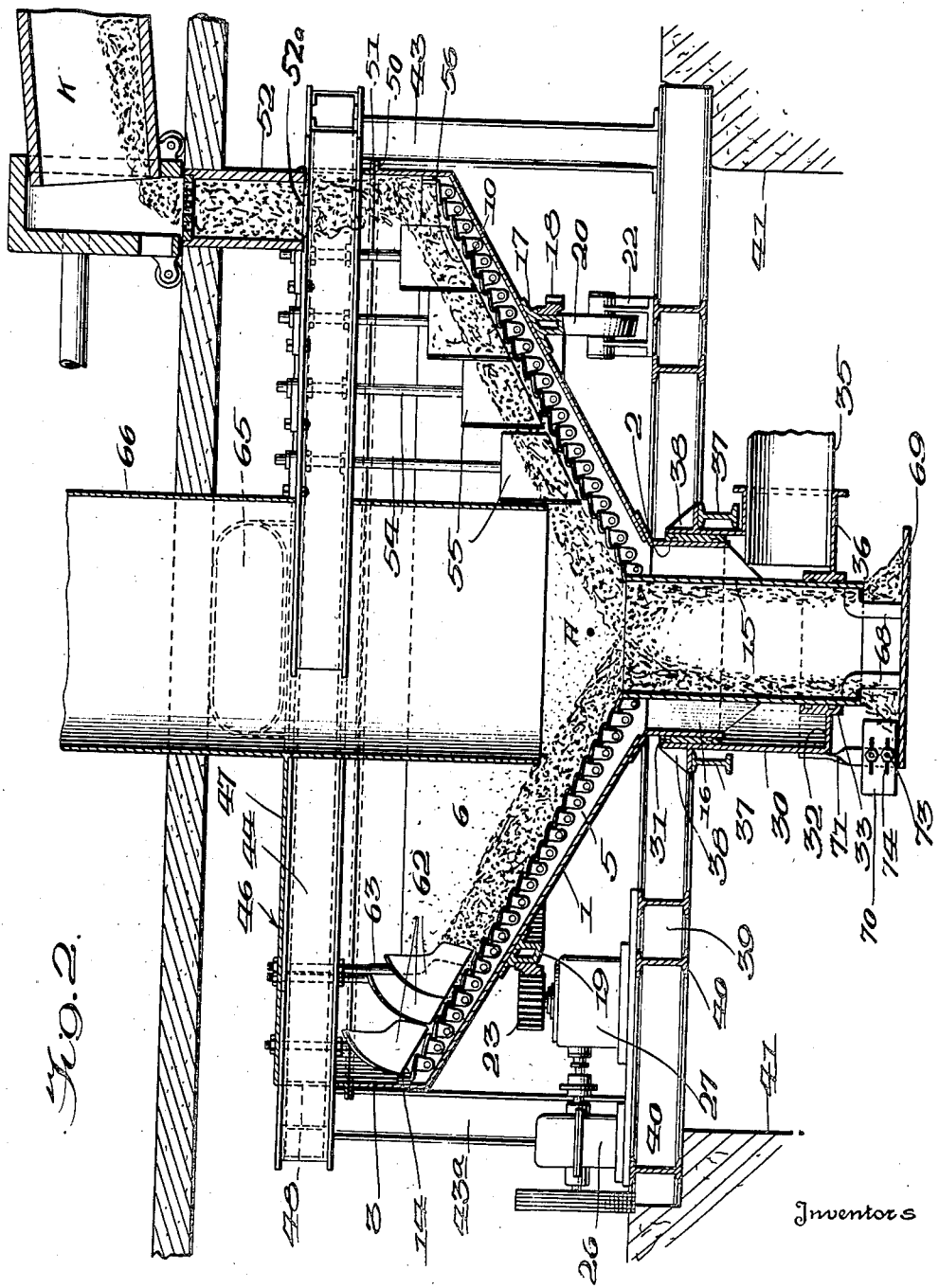

Feb. 5, 1935. R. BERNHARD ET AL 1,989,662
BOWL COOLER
Filed Jan. 10, 1933 3 Sheets-Sheet 3
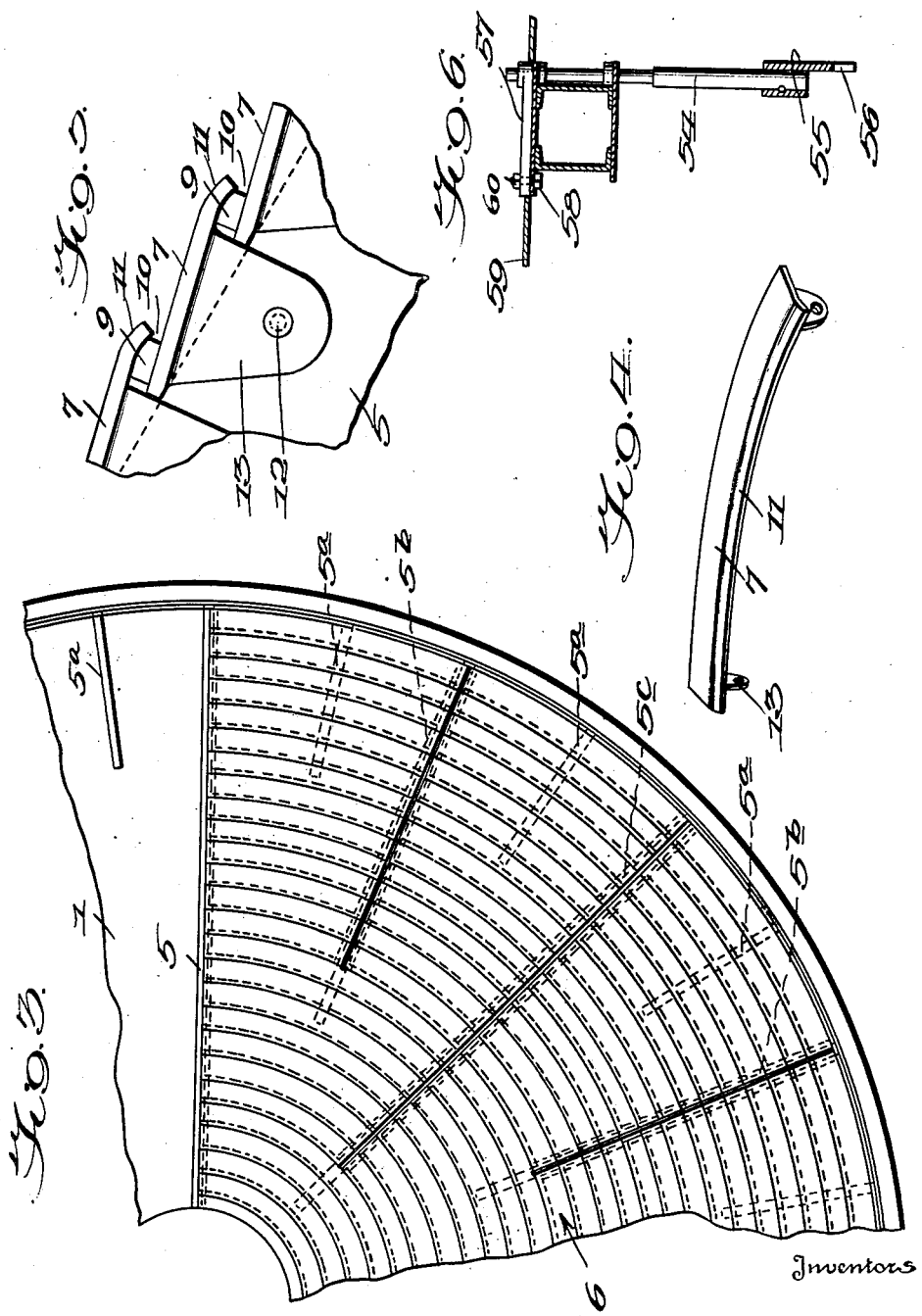
Inventors
Richard Bernhard,
Richard D. Cheesman,
By Eugene H. Purdy
their Attorney Patented Feb. 5, 1935

1,989,662

UNITED STATES PATENT OFFICE 1,989,662

BOWL COOLER

Richard Bernhard and Richard D. Cheesman, Allentown, Pa., assignors to Traylor Engineering and Manufacturing Company, a corporation of Delaware Application January 10, 1933, Serial No. 651,055

11 Claims. (Cl. 34—34)

This invention relates to coolers designed for cooling the products of kilns or roasting furnaces. The general object of the invention is to provide a more efficient type of cooler arranged to receive the hot material upon its discharge from the furnace or kiln and which is particularly adapted for use in those industrial plants where, because of a lack of floor space, the employment of a horizontal rotary cooler is impracticable or undesirable.

In carrying out the invention, the highly heated material issuing from the kiln or furnace, or from a battery of such kilns or furnaces, is discharged onto a grate which slowly rotates about a vertical axis. As the grate revolves the material is advanced thereacross and is cooled by currents of air flowing through openings in the grate into contact with the material. The grate preferably is of concave or of conical shape so as to provide in effect a bowl for supporting the charge of hot material and, by means of a series of stationary deflecting blades the material is progressively displaced across the grate from the top toward the bottom of the bowl and thence out through a discharge outlet located at its bottom. In order to promote and render uniform the cooling of the material, a series of plows are advantageously employed which during rotation of the bowl scoop through the material and turn it over upon the grate.

In the preferred form of the invention, the grate is surrounded by a jacket into which air is introduced under pressure. The air which passes up through the grate into contact with the hot material initially deposited upon the upper portion of the bowl will be heated to a relatively high temperature, and this air may be advantageously utilized as, for example, for supporting combustion of the flame within the kiln or furnace. Accordingly, the grate is provided with a cover or hood which prevents the escape of any appreciable amount of heated air from the bowl and this air is led off through a conduit communicating with the inside of the bowl. Since the air which rises off the grate in the lower or bottom portion of the bowl where the cooling of the material has proceeded to an advanced stage will be on the whole inappreciably heated, the preferred form of the invention contemplates the provision of a second conduit, or flue, extending to a position near the bottom of the bowl for removing this less highly heated air which if desired may be recirculated through the cooler.

Beneath the discharge outlet of the grate, a table is provided for supporting a column of the material within the outlet so as to seal the outlet against the passage of air; and means are provided for removing material from the table at the same rate at which material is added to the top of the column so that the column preserves a substantially constant height.

The invention will be better understood by reference to the following detailed description of a preferred embodiment, taken in conjunction with the annexed drawings, in which:

Figure 2 is a vertical cross-sectional view of the cooler of Figure 1;

Figure 3 is a plan view of approximately a quarter section of the cooler showing the grate construction;

Figure 4 is a perspective of one of the metal plates composing the grate;

Figure 5 is a detailed cross-sectional view through the overlapping circumferential sections of the grate; and Figure 6 is a detailed view of one of the deflecting blades for shifting the material across the grate and illustrating the manner in which the blades are adjustably mounted to vary the rate of advance of the material.

Figure 1:
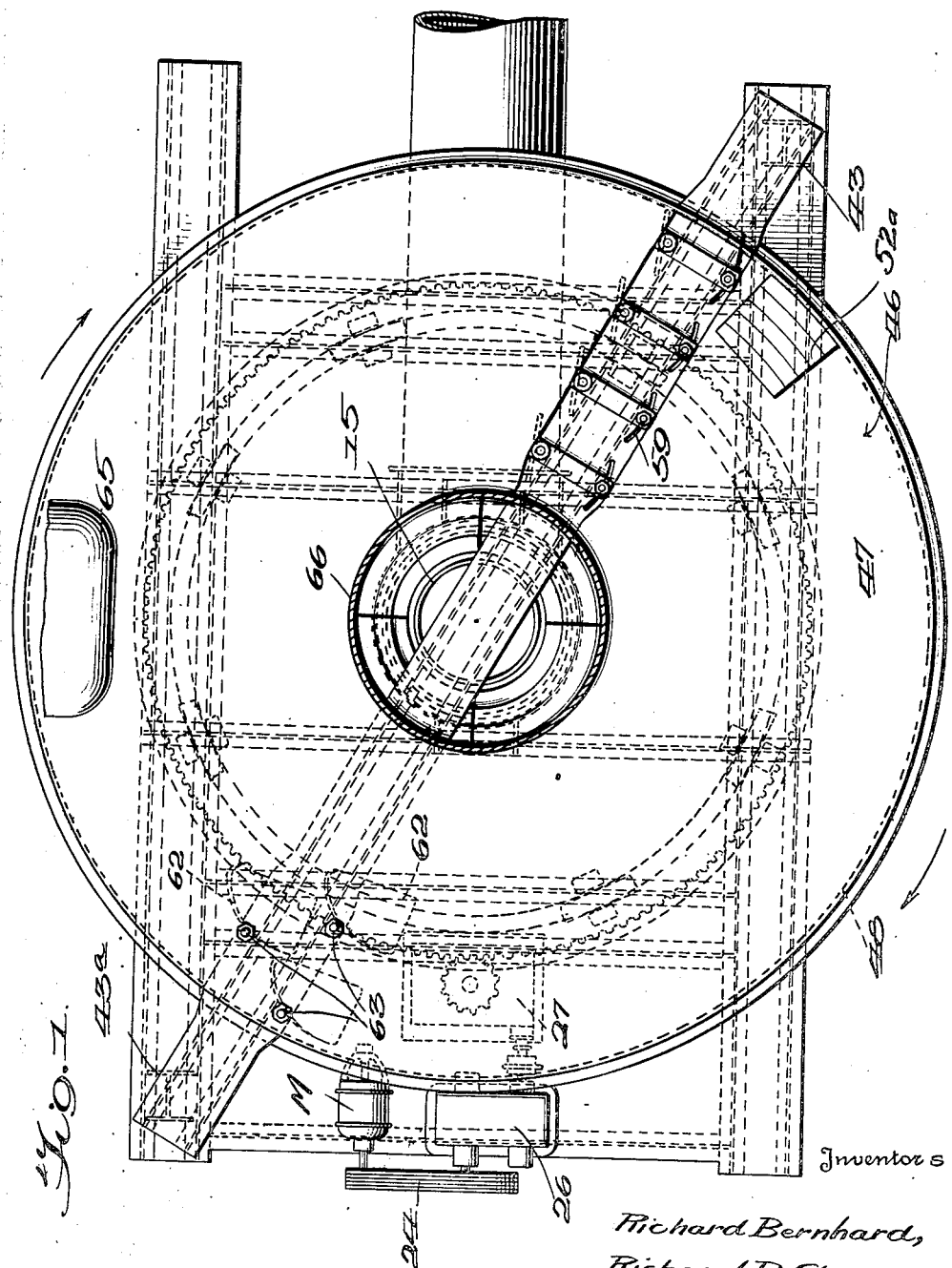
Figure 1 is a plan view of a cooler embodying the invention.

In Figures 1 and 2 is shown a bowl cooler suitable for employment in plants engaged in the manufacture of Portland cement, this cooler comprising a conical-shaped downwardly tapered shell 1 of relatively heavy metal plate. The lower end of the shell terminates in a circular opening and secured to the bottom of the shell is a cylindrical sleeve 2 constituting a prolongation of the opening. The top of the shell is extended vertically upward to form a circular wall 3.

Disposed upon and welded to the inner tapered surface of the shell and extending from top to bottom thereof are a plurality of metal beams 5 and, in addition, a series of supplemental metal beams 5a, 5b, and 5c, which latter reach for varying distances from the top towards the bottom of the shell. The upper ends of these beams abut against the wall 3 to which they are bonded by welding. These beams 5, 5a, 5b, and 5c serve to reinforce the shell and to provide spacing members between the shell 1 and a grate bowl 6 supported upon the beams. The grate bowl 6 is made up of a multitude of arcuate shaped, substantially flat metal plates 7, (Fig. 4) a series of which plates when assembled in end-to-end contact constitutes one of the circumferential grate sections defining the floor of the bowl. Each arcuate plate 7 on its forward end overlaps for a short distance the tail end of a succeeding plate as best shown in Figure 5, the plates being provided upon their under surfaces with spacing lugs 9 which maintain them out of contact and provide passages 10 for the flow of air upwardly through the grate. The ends of the plates 7 where they overlap the next succeeding plates are downwardly curved as shown at 11 so as to overhang and partially close the passages 10 thus preventing the material deposited upon the grate from sifting through the grate. The plates 7 are secured in place by means of bolts 12 which pass through ears 13, integrally formed upon the under sides of the plates, and fasten to the beams 5, 5a, 5b, and 5c.

The pitch or inclination of the grate surface is such that the material thereon has no great tendency to slide down toward its bottom under the action of gravity. The series of arcuate shaped plates 7 comprising the topmost circumferential section of the grate bowl have upwardly directed flanges 14 which are united with the wall 3 of the shell 1. At the bottom of the bowl is an outlet for the discharge of the material therefrom, this outlet comprising a cylindrical spout 15 leading to a position substantially below the lower end of the sleeve 2 and being rigidly connected to the latter through a series of radial wings 16 spaced about its circumference.

The bowl 6 is adapted to be rotated about a vertical axis in the following manner: Girdling the shell 1 at about midheight thereof is a ring 17 which is bolted to the shell and this ring carries upon its circumference a gear 18, while its lower or under surface constitutes a track 19. A series of rollers 20, journaled in brackets 22, are located at suitably spaced intervals around and adjacent the circumference of the shell, these rollers engaging the track 19 and sustaining the full weight of the shell and grate structure. The cooperating tread portions of the track 19 and rollers 20 are beveled at an inclination such that a projection of the line of bearing contact between a roller and the track intersects a projection of the axis of rotation of the roller at a point A, as shown in Fig. 2, located in the vertical axis of the grate, this construction insuring full rolling contact between the rollers and track. For imparting rotation to the unitary shell and grate structure, a pinion 23 meshing with the gear 18 is driven by an electric motor M transmitting motion through a flexible chain or belt 24, a variable drive 26 and a speed reduction mechanism 27.

A bustle pipe 30 of generally cylindrical shape surrounds the lower end of sleeve 2 and discharge spout 15, which former depends a short distance within the upper end of the bustle pipe and which latter extends throughout the sleeve 2 and below the end of the bustle pipe. The inside diameter of the bustle pipe is slightly greater than the external diameter of the sleeve 2, the clearance space therebetween being closed by a bearing ring 31 but permitting rotation of the sleeve 2. The lower end of the bustle pipe 30 is formed with an inwardly directed flange 32 which extends into proximity with the discharge spout 15 and upon the end of this flange is carried a bearing ring 33, similar to the bearing ring 31, engaging the circumference of the spout but allowing rotation of the spout relative to the bustle pipe.

A conduit 35 leading from a source of air pressure, as for example a blower (not shown), communicates with the bustle pipe through an inlet 36. The bustle pipe is stationarily supported upon a pair of parallel I-beams 37 flanking its sides and engaging shoulders 38 integrally formed upon the circumference of the bustle pipe. The I-beams 37 are bolted to the under surface of a rectangular, metal frame 39, this frame being composed of a number of structural members 40 bolted together in rigid assembly. The frame 39, which rests upon concrete piers 41, provides a bed for the motor M and associated drive mechanism and an anchorage for the brackets 22 supporting the rollers 20. Upon the frame 39 at opposite corners thereof are mounted two upright iron columns 43 and 43a supporting upon their elevated ends a horizontally-disposed box-shaped structural member 44 which diametrically spans the grate bowl 6. This structural member supports a stationary hood 46 which closes the top of the bowl. The hood comprises a circular cover plate 47 resting directly upon the structural member 44 and having a depending skirt 48 which is intersected by the structural member. This skirt terminates closely adjacent the upper end of wall 3 of shell 1, and the adjacent ends of the skirt and the wall are exteriorly reinforced by angle irons 50 and 51 respectively. One flange of each angle serves for attachment to either the skirt 48 or the wall 3 while the other flange projects horizontally outwardly, the two horizontal flanges being disposed in juxtaposition whereby to afford a minimum amount of clearance therebetween.

On the floor level of the plant above the cooler as indicated in Figure 2 is a rotary kiln K of the type ordinarily used in the production of clinker in the manufacture of Portland cement, and the clinker issuing from the lower end of the kiln is shown, by way of example, as feeding into a charging chute 52 leading down through the floor and opening into the hood 46. While only a single kiln is shown in the figure, under some circumstances it may be desirable to operate the cooler in conjunction with a plurality of heating units, in which case an appropriate number of charging chutes 52, corresponding to the number of kilns or furnaces, may be suitably located at spaced intervals upon the hood adjacent the circumference of the cover plate 47. The chute shown in the figure communicates with the hood through an opening 52a at a point such that the hot clinker issuing therefrom falls within the upper zone of the grate bowl adjacent the wall 3. The plates 7 forming the circumferential grate sections in the upper reaches of the bowl will preferably be made of some heat-resistant alloy, such as chrome-nickel steel, to avoid burning out the grate where it is subjected to the most intense heating.

Extending downwardly through the cover plate 47 and through the box-like structural member 44 and rotatably mounted therein is a series of rods 54 arranged in a row part way across a radius of the grate. These rods are of different lengths and have fastened upon their lower ends deflecting blades 55, each deflecting blade consisting of a vertically disposed flat metal plate having its lower edge 56 cut off at a slant corresponding approximately to the slope of the grate surface and being located a short distance thereabove. These deflecting blades are sufficient in number to sweep over the major portion of the grate and urge the material lying thereon toward the bottom of the bowl. Fastened upon the upper end of each rod which protrudes above the cover plate is an operating arm 57, as shown in Figure 6, this arm carrying upon its free outer end a bolt 58 receivable within an arcuate-shaped slot 59 (Fig. 1) formed in the cover plate 47. By shifting the operating arm 57 the rod 54 is rocked about its vertical axis so as to change the angularity of the deflecting blade 55 to hasten or retard the progress of the material across the grate. A nut 60 threaded upon the bolt 58 may be tightened to lock the arm in any position of adjustment.

Upon the opposite side of the grate from the deflecting blades 55 is a series of turnover plows 62 (in the present instance three in number) arranged in staggered relation. These plows are fixedly secured to the ends of vertically extending rods 63 which project down through the cover plate 47 and through the structural member 44 and which are non-rotatively secured to the cover plate. Each plow consists of a metal plate disposed adjacent the grate surface and having a roll imparted thereto so that when material rides against the plow during rotation of the grate the shape of the plow is such as to curl the material over upon itself and turn under the upper layers of material and bring the more thoroughly cooled under layers uppermost. The arrangement of the plows in staggered relation insures that all the material in the upper zone of the grate bowl where the material is most highly heated will be acted upon by the plows during each revolution of the grate.

A conduit 65 opening through the cover plate 47 into the hood serves as an off-take for the heated air confined within the hood 46 and within the upper portion of the grate bowl 6. This conduit is of any suitable size and may be covered with a heat-insulating material. Intersecting the hood and projecting to a position near the bottom of the grate is another conduit, or flue, 66, its lower end located axially of the grate and terminating a short distance above the grate surface, so that under normal conditions of operation of the cooler the lower circumferential edge of the flue will be embedded in the material spread upon the grate and thus form a seal whereby to close off the lower portion of the grate bowl from its upper portion. The flue 66 is made somewhat oversize in order to include a portion of the structural member 44 without the latter completely obstructing its passage.

Depending from the discharge spout 15 is a pair of arms 68 which supports a flat, circular receiving table 69 located a short distance below the free end of the spout, and this table rotates with the discharge spout. The material issuing from the discharge spout piles up upon the receiving table, as indicated in Figure 2, and plugs up the discharge spout. The material is removed from the receiving table 69 by a scraper 70 stationarily mounted upon the end of an arm 71 which in turn is fastened to and projects downwardly from the bustle pipe 30, the arrangement being such that upon rotation of the table a part of the material thereon will be swept by the scraper off the table onto a traveling conveyor, not shown, located below the table. The scraper is connected to the arm 71 by means of bolts 73 passing through elongated slots 74 in the scraper to permit adjustment of the scraper inwardly and outwardly of the table to vary the bite of the scraper in the pile of material upon the table.

In operation, the hot material, in this instance cement clinker, coming from the kiln K is delivered through the charging chute 52 onto the grate surface adjacent the upper zone of the bowl 6 during the slow continuous rotation of the bowl. As the bowl is rotated by the motor M in the direction indicated by the arrow in Figure 1 the material is gradually cooled by the air currents flowing up through the air passages 10 in the grate. When the bowl has made approximately one-half a revolution the material reposing upon the grate rides into contact with the plows 62 which turn over the material as has already been described. This causes an equalization of the cooling of the material throughout its depth since all portions of the material are brought into direct contact with or in proximity to the grate surface where the cooling action is greatest. Although only three turnover plows are illustrated in the present embodiment of the invention any suitable number of plows may be employed. Another half-revolution of the grate moves the same material into engagement with the deflecting blades 55, and these blades will be suitably adjusted at such an angle to the path of travel of the material as to urge the material down the inclined grate at the desired rate of advance.

As the grate continues to rotate, material is continuously fed into the bowl through the chute 52 and is progressed step-by-step by the deflecting blades down the inclined upper surface of the grate where after a prescribed number of revolutions the material will have given up a substantial portion of its heat and will have been advanced to a position near the bottom of the grate bowl. The grate surface thus ordinarily will be covered by the material in various stages of cooling. The row of deflecting blades does not extend entirely to the bottom of the bowl but terminates a short distance from the opening of the discharge spout 15, and in this zone of the grate surrounding the entrance to the discharge spout the comparatively cool material which has passed over the grate is brought together. As the grate rotates the terminal deflecting blade of the series nearest the vertical axis of the grate, serves to shove the body of material accumulating at the bottom of the grate under the lower end of the flue 66 and toward the discharge spout. This spills a portion of the material into the discharge spout through which it falls onto the column of material filling, or partially filling, the spout. The scraper 70 is so adjusted as to remove material from the rotating receiving table 69 onto a conveyor at the same speed that material is discharged into the spout which results in a continuous movement of material through the spout while at the same time maintaining the spout closed to prevent the escape of air from within the grate bowl via this outlet.

It will be apparent from the structure which has been described that the air delivered under pressure from the conduit 35 into the bustle pipe 30 will pass upwardly into the space between the shell 1 and the grate 6, constituting a jacket about the grate, and will then flow through the air passages 10 of the grate into cooling contact with the material reposing thereon. The air arising through the grate in the upper zone of the bowl will experience an appreciable increase in temperature because of the more highly heated condition of the material in this locality. This highly heated air is removed through the conduit 65 which communicates with the hood 46 and it may be advantageously used in the kiln to support combustion with a consequent increase in its heating efficiency. The air arising from the grate at the lower end or nearest the bottom of the grate, on the other hand, is not so highly heated because the cooling of the material near the bottom of the grate is almost complete. The flue 66 extending into the bottom of the grate serves to carry off this cooler air, and this flue may communicate with the exhaust side of the blower (not shown) which supplies air under pressure to the bustle pipe 30. In this way all of the air passing through the cooler may be conveniently disposed of, although the provision of means for removing the air from the grate bowl is not essential to the successful utilization of the principles of the invention.

We claim:

1. A cooler of the character described comprising a grate rotatable about a vertical axis and having a downwardly converging upper surface adapted to support a layer of heated material thereon at an inclination not exceeding the angle of repose of the material, said grate being provided with air passages, a jacket surrounding said grate and rotatable therewith, means for supplying air under pressure to the jacket for inducing a flow of air through said air passages and into contact with the heated material to cool the latter, a discharge outlet located at the bottom of the grate, and means for rotating the grate and for advancing the material across the grate toward the discharge outlet.

2. A cooler of the character described comprising a grate rotatable about a vertical axis and having a downwardly converging apertured surface adapted to support a layer of heated material thereon, a jacket surrounding said grate and rotatable therewith, a discharge outlet located at the bottom of the grate, a spout extending downwardly from the discharge outlet, a stationary bustle pipe surrounding the spout and affording a space thereabout communicating with the jacket, means for supplying air under pressure to the bustle pipe, and means for rotating the grate and jacket as a unit.

3. A cooler of the character described comprising a grate rotatable about a vertical axis and having a downwardly converging upper surface adapted to support a layer of heated material thereon at an inclination not exceeding the angle of repose of the material, said grate being composed of a series of over-lapping non-contacting plates affording air passages therebetween, a shell surrounding and connected to said grate so as to define a jacket thereabout, means for supplying air under pressure to the jacket for inducing a flow of air through said air passages and into contact with the heated material to cool the latter, a discharge outlet located at the bottom of the grate, means for advancing the material along the grate toward and into the discharge outlet, means for rotating the grate, and means for supporting a column of material within the discharge outlet during rotation of the grate.

4. A cooler of the character described comprising a grate rotatable about a vertical axis and having a downwardly converging upper surface adapted to support a layer of heated material thereon at an inclination not exceeding the angle of repose of the material, said grate being composed of a series of over-lapping non-contacting plates affording air passages therebetween, a shell surrounding and connected to said grate so as to define a jacket thereabout, means for supplying air under pressure to the jacket for inducing a flow of air through said air passages and into contact with the heated material to cool the latter, a discharge outlet located at the bottom of the grate, means for rotating the grate, means for advancing the material across the grate toward and into the discharge outlet during rotation of the grate, a receiving table located below the discharge outlet and adapted to rotate with the grate, said receiving table being adapted to support a pile of material thereon to close the discharge outlet, and a scraper stationarily mounted for removing material from the receiving table at the same rate that material enters the discharge outlet.

5. A cooler of the character described comprising a grate rotatable about a vertical axis and having a downwardly converging upper surface adapted to support a layer of heated material thereon at an inclination not exceeding the angle of repose of the material, said grate being provided with air passages, a shell surrounding and connected to said grate so as to define a jacket thereabout, means for supplying air under pressure to the jacket for inducing a flow of air through said air passages and into contact with the heated material to cool the latter, a discharge outlet located at the bottom of the grate, means for rotating the grate, means for advancing the material across the grate toward the discharge outlet, a hood for confining within the interior of the grate the air issuing from said passages, and a conduit for withdrawing the air from the interior of said grate.

6. A cooler of the character described comprising a grate rotatable about a vertical axis and having a downwardly converging upper surface adapted to support a quantity of heated material thereon, said grate being provided with air passages, a jacket surrounding said grate, means for supplying air under pressure to the jacket for inducing a flow of air through said air passages and into contact with the heated material to cool the latter, a discharge outlet located at the bottom of the grate, means for rotating the grate, means for advancing the material across the grate toward the discharge outlet, a hood for confining within the interior of the grate the air issuing from said passages, a conduit for withdrawing the heated air adjacent the top of said grate, and a flue for withdrawing the cooler air adjacent the bottom of said grate.

7. A cooler of the character described comprising a grate rotatable about a vertical axis and having a downwardly converging upper surface adapted to support a quantity of heated material thereon, said grate being provided with air passages, a jacket surrounding said grate, means for supplying air under pressure to the jacket for inducing a flow of air through said air passages and into contact with the heated material to cool the latter, a discharge outlet located at the bottom of the grate, means for rotating the grate, means for advancing the material across the grate toward the discharge outlet, a hood for confining within the interior of the grate the air issuing from said passages, a conduit for withdrawing the heated air adjacent the top of said grate, and a flue for withdrawing the cooler air adjacent the bottom of said grate, the lower end of said flue extending to a position near the surface of the grate and normally adapted to embed within the material supported upon the grate.

8. A cooler of the character described comprising a grate rotatable about a vertical axis and having a downwardly converging upper surface adapted to support a layer of heated material thereon at an inclination not exceeding the angle of repose of the material, said grate being provided with air passages, a shell surrounding and connected to said grate so as to define a jacket thereabout, means for supplying air under pressure to the jacket for inducing a flow of air through said air passages and into contact with the heated material to cool the latter, a discharge outlet located at the bottom of the grate, means for advancing the material along the grate toward and into the discharge outlet during rotation of the grate, and means for rotating the grate comprising a track encircling the shell intermediate its height, a series of rollers engaging said track for supporting said grate, a ring gear surrounding said shell and a driving pinion engaging said ring gear.

9. A cooler of the character described comprising a grate rotatable about a vertical axis and having a downwardly converging upper surface adapted to support a layer of heated material thereon at an inclination not exceeding the angle of repose of the material, said grate being provided with air passages, a shell surrounding and connected to said grate so as to define a jacket thereabout, means for supplying air under pressure to the jacket for inducing a flow of air through said air passages and into contact with the heated material to cool the latter, a discharge outlet located at the bottom of the grate, means for advancing the material along the grate toward and into the discharge outlet during rotation of the grate, and means for rotating the grate comprising a beveled track encircling the shell intermediate its height, a series of correspondingly beveled rollers engaging said track for supporting said grate, a ring gear surrounding said shell and a driving pinion engaging said ring gear.

10. A cooler of the character described comprising a grate rotatable about a vertical axis and having a downwardly converging upper surface adapted to support a layer of heated material thereon at an inclination not exceeding the angle of repose of the material, said grate being provided with air passages, a jacket surrounding said grate, means for supplying air under pressure to the jacket for inducing a flow of air through said air passages and into contact with the heated material to cool the latter, a discharge outlet located at the bottom of the grate, means for rotating the grate, means for advancing the material across the grate toward the discharge outlet, a hood for confining within the interior of the grate the air issuing from said passages, and a vertically extending flue terminating adjacent the bottom of the grate for withdrawing the cooler air from the grate.

11. A cooler of the character described comprising a grate rotatable about a vertical axis and having a downwardly converging upper surface adapted to support a layer of heater material thereon at an inclination not exceeding the angle of repose of the material, said grate being provided with air passages, a jacket surrounding said grate, means for supplying air under pressure to the jacket for inducing a flow of air through said air passages and into contact with the heated material to cool the latter, a discharge outlet located at the bottom of the grate, means for rotating the grate, means for advancing the material across the grate toward the discharge outlet, a hood for confining within the interior of the grate the air issuing from said passages, and a flue having its end terminating in the vertical axis of the grate and adjacent the surface of the grate so as to normally embed within the material reposing upon the grate.

RICHARD BERNHARD.
RICHARD D. CHEESMAN.